(12) United States Patent
Berbecel

(10) Patent No.: US 6,888,530 B1
(45) Date of Patent: May 3, 2005

(54) ENHANCED METHOD OF ENCODING PROGRESSIVE VIDEO SEQUENCES WHEN EMPLOYING INTERLACED CODECS

(75) Inventor: Gheorghe Berbecel, Richmond Hill (CA)

(73) Assignee: Maxim Integrated Products, Inc., Sunnyvale, CA (US)

(*) Notice: Subject to any disclaimer, the term of this patent is extended or adjusted under 35 U.S.C. 154(b) by 326 days.

(21) Appl. No.: 10/306,210

(22) Filed: Nov. 27, 2002

Related U.S. Application Data
(60) Provisional application No. 60/333,968, filed on Nov. 28, 2001.

(51) Int. Cl.$^7$ .............................. G09G 5/00
(52) U.S. Cl. ............ 345/103; 345/211; 348/466; 375/240.12
(58) Field of Search ............ 348/466; 375/240.12; 345/103, 211, 213

(56) References Cited

U.S. PATENT DOCUMENTS

| | | | | |
|---|---|---|---|---|
| 4,222,076 A | * | 9/1980 | Knowlton | .............. 358/470 |
| 5,497,199 A | * | 3/1996 | Asada et al. | .............. 348/446 |

* cited by examiner

Primary Examiner—Richard Hjerpe
Assistant Examiner—Ke Xiao
(74) Attorney, Agent, or Firm—Blakely, Sokoloff, Taylor & Zafman LLP

(57) ABSTRACT

In one embodiment, a method comprises an act of separating a progressive scanned frame into a plurality of fields. The plurality of fields includes at least a first field being a first portion of the progressive scanned frame and a second field being a second portion of the progressive scanned frame. In addition, the method further comprises an act of compressing data associated with the first portion of the progressive scanned frame and the second portion of the progressive scanned frame with interlaced compression logic.

20 Claims, 4 Drawing Sheets

ENHANCED METHOD OF ENCODING PROGRESSIVE VIDEO SEQUENCES WHEN EMPLOYING INTERLACED CODECS

CROSS-REFERENCE TO RELATED APPLICATION

This Application claims the benefit of priority of U.S. Provisional Patent Application No. 60/333,968 filed Nov. 28, 2001.

FIELD

The invention relates to the field of signal processing. In particular, one embodiment of the invention relates to a system and method for supporting progressive video processing using coder and decoder logic that support interlaced video processing.

GENERAL BACKGROUND

Many decades ago, interlaced video processing was developed for the transmission of video sequences, namely a collection of video frames each containing an ordered number of scan lines. Interlaced video processing includes an interlaced scanning operation where a video frame is transformed into even and odd fields. In addition, the even and odd fields are processed and converted back into a video frame for display. Examples of various types of processing operations include compression and decompression for example.

Typically, interlaced video processing is accomplished by separating a video frame 100 into even and odd fields as shown in FIG. 1. The odd field 130 contains odd numbered scan lines 110 of the video frame 100 while the even field 140 contains all even numbered scan lines 120. One disadvantage with the interlacing process is that it requires a transmitter to employ enough buffer memory to store an entire frame of data. For instance, frame buffer memory would be used to store the even field 140 while the odd field 130 is routed to a coder/decoder (codec), such as a Motion Picture Experts Group (MPEG) codec for example. The MPEG codec performs compression operations on the odd field 130 and subsequently the even field 140 as well. Another disadvantage is that the interlacing process produces a greater number of visual artifacts because existing devices perform digital filtering or other operations on the fields 130 and 140, which may cause adverse effects on the clarity of the image.

After MPEG compression and decompression, the fields are combined again into a frame by a process called deinterlacing. In order to perform the deinterlacing process, buffer memory sized to accommodate at least one field of data is required. This buffer memory stores the previous field that has to be present at the same time with the current field. Again, the deinterlacing process introduces visual artifacts because of some further processing performed usually during deinterlacing.

Recently, a newer and superior video processing method called "progressive" video processing has been developed. Progressive video processing permits an entire image to be displayed sequentially from top to bottom without the odd/even interlacing. In other words, instead of the video frame being split into two fields, one containing odd numbered scan lines and the other containing even numbered scan lines, the video frame is completely scanned from top to bottom in one pass. The problem with many products supporting progressive scanning is that expensive, less common codecs are needed rather than less expensive codecs solely supporting interlacing (referred to as "interlaced codecs"). This increases product costs which are passed on to the consumer.

Thus, there would be benefits in developing a system and method that supports progressive video processing but uses interlaced codecs.

BRIEF DESCRIPTION OF THE DRAWINGS

The features and advantages of embodiments of the invention will become apparent from the following detailed description of the invention in which.

DETAILED DESCRIPTION

Herein, an exemplary embodiment of the invention relates to a system and method for supporting progressive video processing using coder/decoder logic that is designed to exclusively support interlaced video processing (referred to as "interlaced codecs"). The embodiment described herein is not exclusive; rather, it merely provides a thorough understanding of the invention. Also, well-known circuits are not set forth in detail in order to avoid unnecessarily obscuring the invention.

In the following description, certain terminology is used to describe features of the invention. For example, the term "information" is defined as one or more of the following: video, data, address, or control. An "image" is one or more visible objects associated with one or more video frames generated for display on a monitor (e.g., computer display, television). The term "logic" or "logic component" includes any hardware circuitry, software, firmware or any combination thereof. A "processing unit" is any logic that is configured to process information. Examples of certain types of processing units include, but are not limited or restricted to a general purpose microprocessor, a digital signal processor, a microcontroller, a state machine, or even an application specific integrated circuit.

In addition, a "link" is broadly defined as one or more physical or virtual information-carrying mediums to establish a communication pathway. Examples of the medium include a physical medium (e.g., electrical wire, optical fiber, cable, etc.) or a wireless medium (e.g., air in combination with wireless signaling technology).

Figure 1:
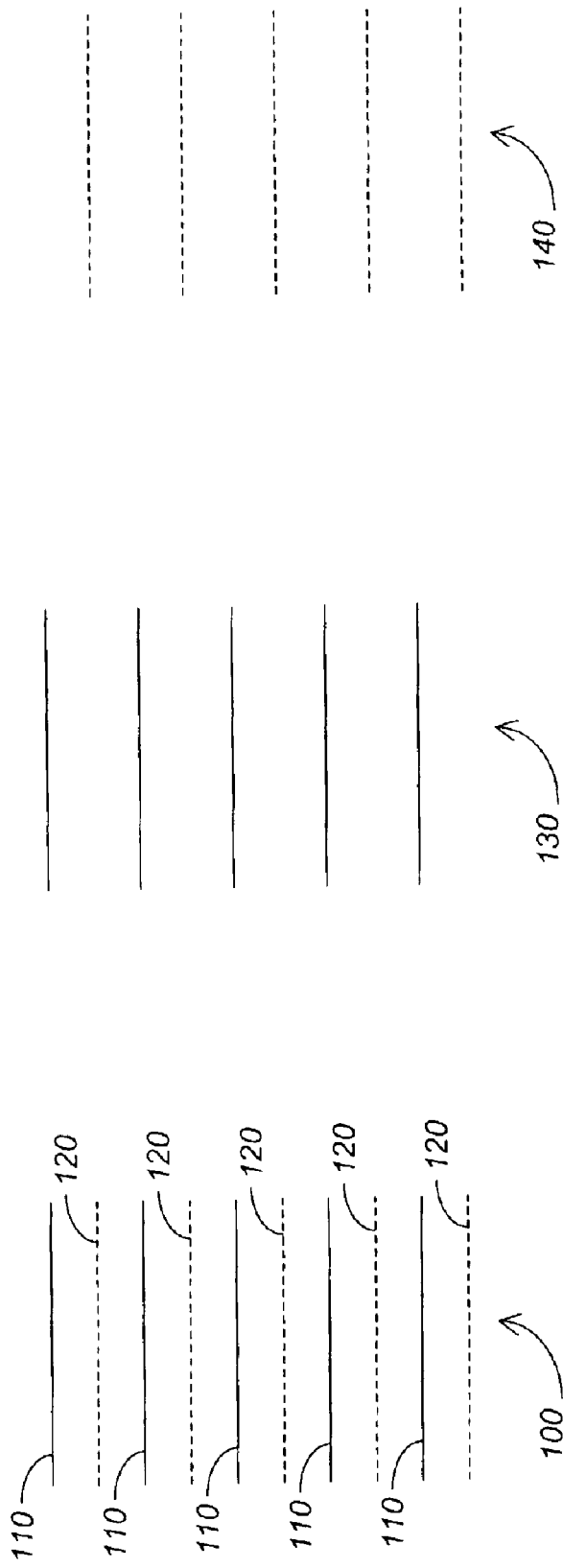
FIG. 1 is a block diagram of a conventional video interlacing process.
Figure 2:
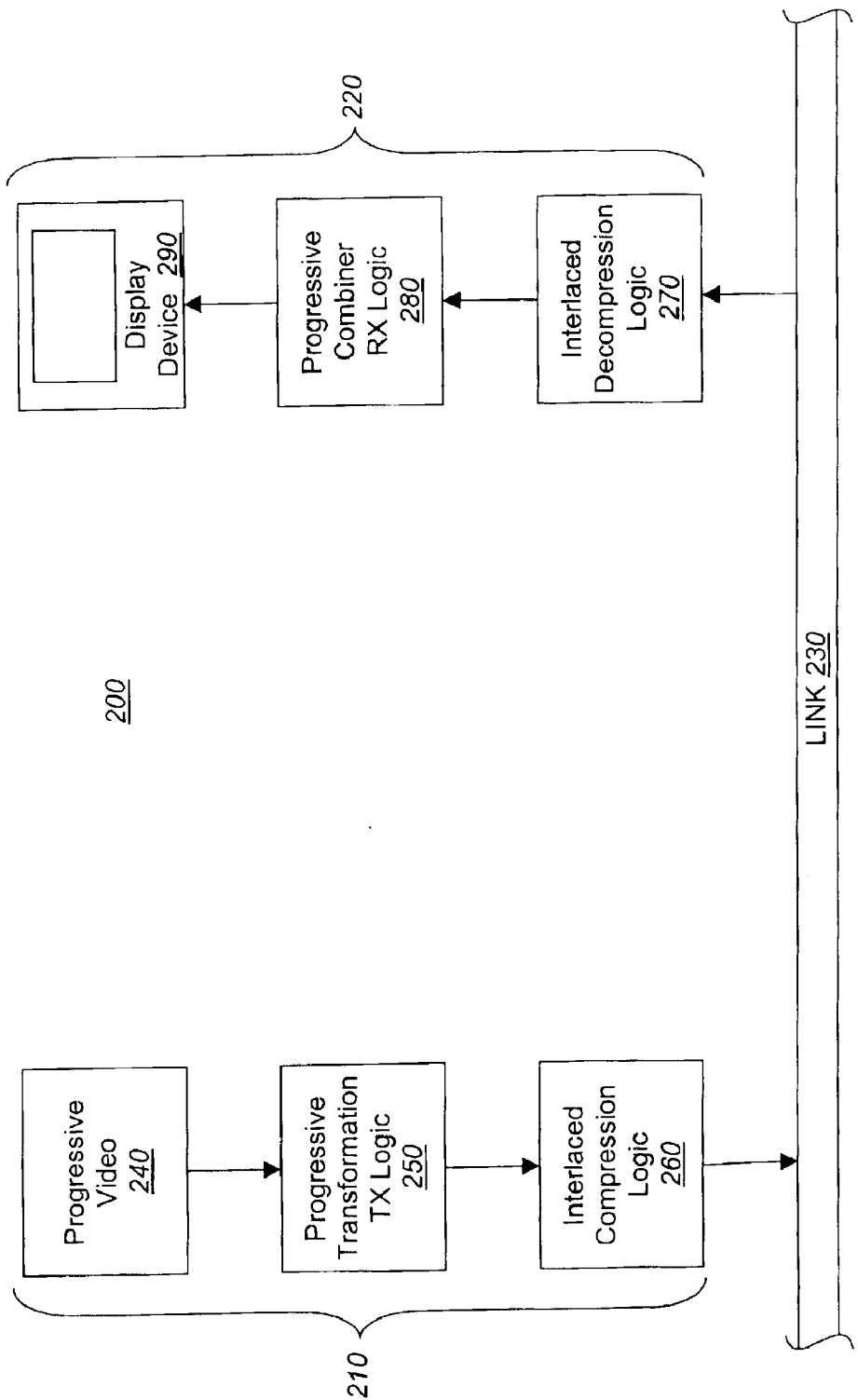
FIG. 2 is an illustrative embodiment of a communication system operating in accordance with the invention.

Referring to FIG. 2, an illustrative embodiment of a communication system 200 comprising a video source 210 and a video display 220 coupled together through a link 230 is shown. In this embodiment, the video source 210 is a computer (e.g., a desktop, laptop, network computer, etc.) that is adapted to generate and transmit progressive video over the link 230.

Prior to transmission, progressive video 240 is routed to progressive transformation (TX) logic 250 that performs field transformations as described below. The transformed fields are compressed by interlaced compression logic 260 employed either within the video source 210 as shown or within a peripheral product (e.g., modem). "Progressive video" includes one or more video frames completely scanned without any interlaced scanning. Other embodiments for the video source 210 include a set-top box or a digital video disk (DVD) player for example.

As shown, the video display 220 receives the compressed video over the link 230. Interlaced decompression logic 270 decompresses the video and routes the decompressed video fields to progressive transformation (RX) logic 280. The progressive transformation (RX) logic 280 converts the fields back into video frames for subsequent display on a display device 290. The interlaced decompression logic 270 and/or progressive transformation (RX) logic 280 may be placed within the video display 220 or within a peripheral product operating as an interface between link 230 and the video display 220. The interlaced compression logic 260 and decompression logic 270 may include coder/decoder logic (referred to as "codecs") operating in accordance with any current or future compression and corresponding decompression function. In one embodiment, the compression and/or decompression function complies with Moving Pictures Experts Group "MPEG" standards (e.g., MPEG-1, MPEG-2, MPEG-3, or MPEG-4), although other types of compression or decompression techniques may be used.

Figure 3:
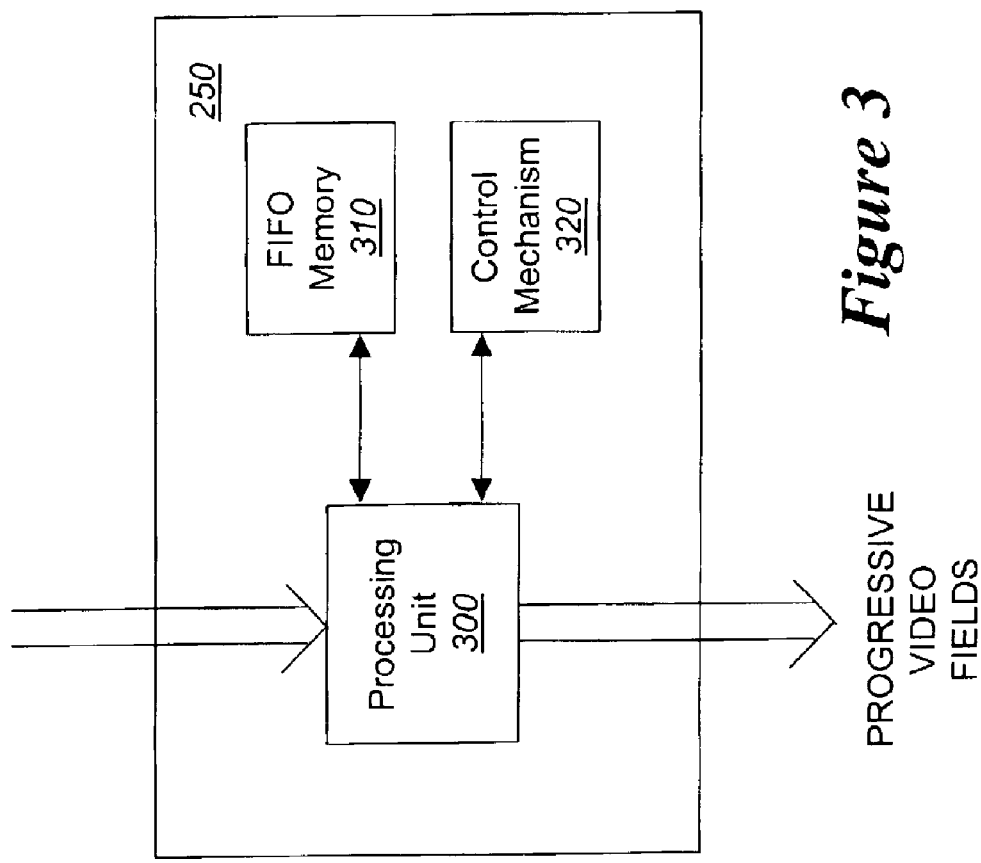
FIG. 3 is an illustrative embodiment of the progressive transformation (TX) logic operating in combination with the interlaced compression logic implemented within the system of FIG. 2.

Referring now to FIG. 3, an illustrative embodiment of the progressive transformation (TX) logic 250 operating in combination with the interlaced compression logic 260 (e.g., MPEG codec) implemented within the system 200 of FIG. 2 is shown. Herein, the progressive transformation (TX) logic 250 comprises a processing unit 300, a First-Input First-Output (FIFO) memory 310 and a control mechanism 320. For a cathode ray rube (CRT) video display, for example, the size of the FIFO memory 310 may be adjusted to be generally equivalent to such memory needed to store data associated with the number of scan lines produced during the duration of a Vertical Synchronous (V-SYNC) signal. Memory is required because a V-SYNC signal in a progressive mode has a different pattern than a V-SYNC signal in an interlaced mode.

Figure 4:
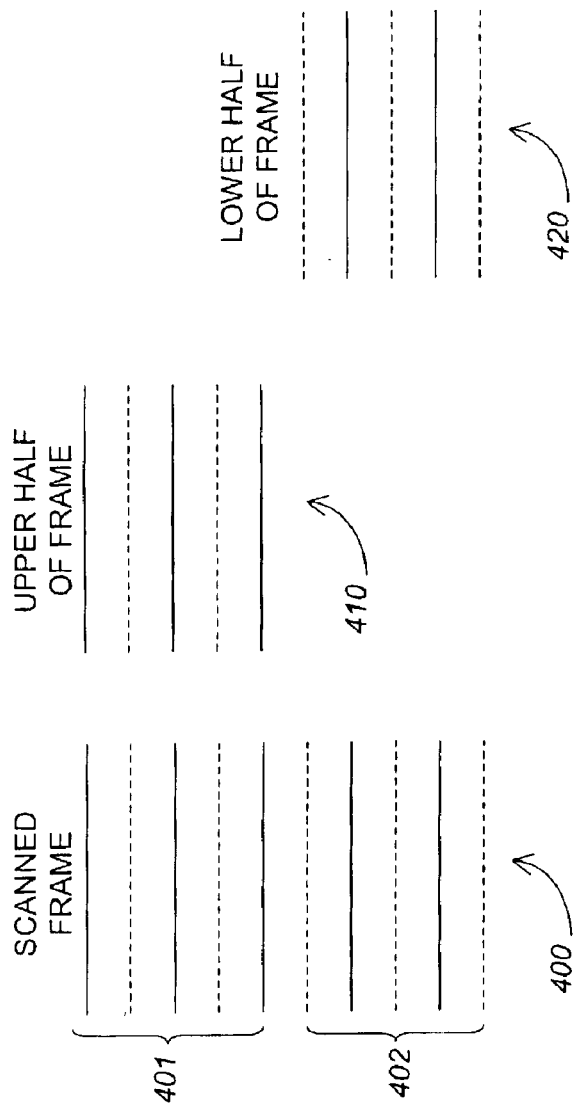
FIG. 4 is an exemplary diagram of the operations of the progressive transformation (TX) logic to support progressive video programming using interlaced compression logic.

As shown in both FIGS. 3 and 4, the processing unit 300 generally splits the progressive scanned frame 400 into two fields 410 and 420. However, the first field 410 is generally equivalent to an upper half 401 of the scanned frame 400 while the second field 420 is generally equivalent to a lower half 402 of the scanned frame 400. These fields 410 and 420 are forwarded to the interlaced compression logic 320 which compresses each field before transmission over link 230.

As an example, in accordance with the National Television Standards Committee NTSC), the scanned frame 400 may be 525 lines in which the first field 410 is generally equivalent to the first 262.5 scan lines of the scanned frame 400 and the second field 420 is generally equivalent to the last 262.5 scan lines of the frame 400. In accordance with Phase Alternate Line (PAL), the scanned frame 400 may be equivalent to 625 scan lines in which the first field 410 is generally equivalent to the first 312.5 scan lines and the second field 420 is generally equivalent to a portion of the scanned frame 400 associated with the last 312.5 scan lines. Further in accordance with Sequential Coleur Avec Memoire (SECAM), the scanned frame 400 may be equivalent to 819 scan lines in which the first field 410 is generally equivalent to the first 409.5 scan lines and the second field 420 is generally equivalent to the last 409.5 scan lines. It is contemplated that the separation of the scanned frame 400 need not result in identically sized fields 410 and 420.

This splitting of the progressive scanned frame 400 into two fields 410 and 420 prior to compression by interlaced compression logic (e.g., MPEG codec) has a significant impact on the simplicity of the hardware implementation, on the way the motion estimation works and on the video quality of the resulting video sequence. Instead of using an interlacer device, namely a memory controller and frame buffer, the control mechanism 320 may be configured to operate in conjunction with the processing unit 300 to detect the scan line in the middle of the video frame 400. In one embodiment, the control mechanism 320 is a counter that is reset by a Field V-SYNC signal, being a signal having a frequency approximately twice a frequency of the (Frame) V-SYNC signal, and incremented or decremented by a Horizontal Sync (H-SYNC) signal.

For instance, an example of the operations may be shown using incoming progressive video (720×480), namely 480 lines with 720 pixels per line. Each pixel is 24-bits featuring red, green and blue (RGB) components. There are also at least 3 additional signals: H-SYNC, Field V-SYNC, and a Clock. Although not shown, the control mechanism 320 comprises a line counter that is reset by the Field V-SYNC signal and is incremented by the H-SYNC signal.

In this embodiment, when the line counter has reached the value of 239 (starts from 0), being one-half of 480, an additional counter for pixels is started and it is incremented by the pixel clock in order to determine the end of the $240^{th}$ line (e.g., line 239). When the value of 719 (starting with 0) has been reached, a flag is set to initiate the Field V-SYNC signal generation. The setting of the flag also causes incoming data associated with the second field (line 240 et seq.) as well as the remainder of the progressive video, to be loaded into the FIFO memory, not directly to the output.

When the Field V-SYNC signal has completed, the contents of the FIFO memory, namely data for the generation of lines for the next field, are routed to the interlaced compression logic 260 of FIG. 2. Both the line and pixel counters are reset.

During processing of the second field of the frame, the data associated with that field is loaded into the FIFO memory and the FIFO memory is subsequently read to recover such data. In one embodiment, the data from the first field does not go to the FIFO memory during the frame splitting process, contrary to the receiver (as described below) where the data from the first field is loaded into the FIFO memory and is read from the FIFO memory until completion of the Field V-SYNC signal, which causes the FIFO memory to be emptied, and thereafter, the incoming lines to be output directly and not loaded into the FIFO memory.

In another embodiment, it is contemplated that a pixel counter may be removed with reliance of the transmission process exclusively on the detected value of the line counter.

Figure 5:
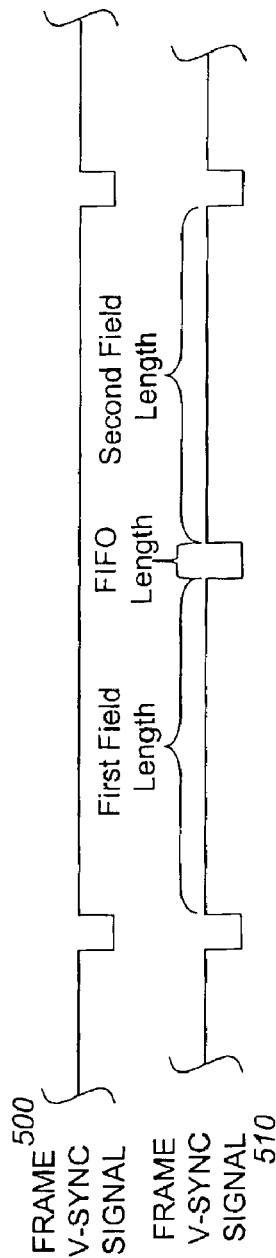
FIG. 5 is an exemplary diagram of signal timing to indicate size constraints necessary for a FIFO memory associated with both progressive transformation (TX) logic at the video source and progressive transformation (RX) logic at the video display.

Referring to FIG. 5, an exemplary embodiment of the computations for the size of the FIFO memory 310 is shown. The size of the FIFO memory 310 is generally equivalent to the amount of data associated with a number of scan lines capable of being read or produced during the duration of the Field V-SYNC signal 510. For example, for NTSC, the size of the FIFO memory 310 should be capable of storing data for 23 scan lines while data storage for 25 scan lines is needed for PAL.

With respect to receivers, instead of a device to support deinterlacing operations, the progressive transformation (RX) logic 280 of FIG. 2 similarly comprises a processing unit, FIFO memory and a control mechanism to perform opposite functions to those performed for interlacing. Herein, the FIFO memory is filled both at the beginning of the first field in order to compensate for the Field V-SYNC signal between the first and second field and after that the FIFO memory is continuously updated and read to create the output frame. During the Field V-SYNC signal between the first and second fields as shown in the FIG. 5, the FIFO memory is emptied and the continuity of the output frame is preserved. As a result, the motion estimation process performed by most interlaced codecs will work much better because the correlation between fields will be now the same as between frames.

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. A method comprising:
separating a progressive scanned frame into a plurality of fields, the plurality of fields including a first field being a first portion of the progressive scanned frame and a second field being a second portion of the progressive scanned frame; and
compressing data associated with the first portion of the progressive scanned frame and the second portion of the progressive scanned frame with interlaced compression logic.

2. The method of claim 1, wherein the first portion of the progressive scanned frame forming the first field is an upper half of the progressive scanned frame.

3. The method of claim 1, wherein the second portion of the progressive scanned frame forming the second field is a lower half of the progressive scanned frame.

4. The method of claim 2, wherein the first portion of the progressive scanned frame comprises a first 262.5 scan lines of the progressive scanned frame.

5. The method of claim 4, wherein the second portion of the progressive scanned frame comprises a remaining 262.5 scan lines of the progressive scanned frame.

6. The method of claim 2, wherein the first portion of the progressive scanned frame comprises a first 312.5 scan lines of the progressive scanned frame.

7. The method of claim 6, wherein the second portion of the progressive scanned frame comprises a remaining 312.5 scan lines of the progressive scanned frame.

8. The method of claim 3, wherein the first portion of the progressive scanned frame fails to share a scan line with the second portion of the progressive scanned frame.

9. The method of claim 1, wherein the first portion of the progressive scanned frame comprises data associated with a grouping of initial scan lines of the progressive scanned frame while the second portion of the progressive scanned frame comprises data associated with scan lines of the progressive scanned frame excluding the grouping of initial scan lines.

10. A video source comprising:
a first logic component to separate a progressive scanned video frame into a plurality of fields each including data associated with both even and odd scan lines; and
a compression logic component to perform compression operations on each of the plurality of fields.

11. The video source of claim 10, wherein the plurality of fields compressed by the first logic component comprises (i) a first field including data associated with both even and odd scan lines between and inclusive of a first selected scan line of the progressive video scanned frame and a second selected scan line of the progressive scanned video frame, and (ii) a second field including data associated with all remaining scan lines of the progressive scanned video frame.

12. The video source of claim 11, wherein the first field of the progressive scanned video frame is an upper half of the progressive scanned video frame formed by scan lines between the first selected scan line up to the second selected scan line while the second field of the progressive scanned video frame is a lower half of the progressive scanned video frame.

13. The video source of claim 11, wherein the first field comprises a first 262.5 scan lines of the progressive scanned video frame.

14. The video source of claim 12, wherein the first field comprises a first 312.5 scan lines of the progressive scanned video frame.

15. The video source of claim 10, wherein the first logic component comprises
a processing unit; and
a memory sized to store data associated with a number of scan lines produced during a duration of a vertical sync (V-SYNC signal) for one of the plurality of fields.

16. The video source of claim 15, wherein the first logic component further comprising a control mechanism to detect a scan line within the progressive scanned video frame, the control mechanism including a line counter reset by the V-SYNC signal and incremented by a horizontal sync (H-SYNC) signal.

17. The video source of claim 16, wherein the control mechanism of the first logic component further comprising a counter for counting pixels associated with a scan line, the counter being incremented by a pixel clock.

18. A video display comprising:
an interlaced Moving Picture Experts Group (MPEG) coder/decoder (MPEG codec) to decompress an incoming video frame to recover a progressive scanned video frame including a plurality of fields, each of the plurality of fields including data associated with both even and odd scan lines of the progressive scanned video frame; and
a logic component to join the plurality of fields to produce the progressive scanned video frame.

19. The video display of claim 18, wherein the plurality of fields recovered by the interlaced MPEG codec comprise (i) a first field including data associated with both even and odd scan lines between and inclusive of a first scan line of the progressive video scanned frame and a selected scan line of the progressive scanned video frame, and (ii) a second field including data associated with the selected scan line up to a last scar line of the progressive scanned video frame.

20. The video display of claim 18, wherein the first logic component includes a processor unit, a memory coupled to the processor unit and at least one counter coupled to the processor unit.

* * * * *